Patented Jan. 3, 1939

2,142,739

UNITED STATES PATENT OFFICE 2,142,739

FERMENTATION PROCESS OF TREATING SULPHITE WASTE LIQUOR

Fredrick J. Wallace, Erie, Pa., assignor to Robeson Process Company, New York, N. Y., a corporation of New Jersey No Drawing. Application September 26, 1936, Serial No. 102,811

4 Claims. (Cl. 195—2)

This invention or discovery relates to treating sulphite waste liquor; and it comprises a method of improving sulphite waste liquor for tanning purposes by removal of carbohydrates therefrom, and of producing citric acid from the contained carbohydrates, wherein weak sulphite waste liquor is neutralized with lime, innoculated with citric acid-producing organisms and fermented, advantageously under air pressure, to produce calcium citrate and a purified sulphite waste liquor, which are separately withdrawn for appropriate utilization; all as more fully hereinafter set forth and as claimed.

Sulphite waste liquor carries in solution about half the total solids of wood digested with sulphite liquor, the remaining half being recovered as cellulose. It is utilized in making various commercial preparations, among them adhesives and tanning liquors. It is a liquid of extremely complicated character, carrying in solution many different chemical substances. It contains all the soluble matters of the wood (extractives) and, in addition, many other things brought into solution by the acid sulphite. Among these are certain characteristic bodies derived from the lignin of the wood by the action of $SO_2$ and usually called "lignosulphonic acids". The other bodies present include a substantial amount of sugars; both hexoses (dextrose) and pentoses. There are other carbohydrates of less definite nature, including pentosans (wood gum). For tanning purposes, the carbohydrates and constituents other than the lignosulphonic acids are less desirable. In making adhesives by concentrating the weak waste liquor, these various carbohydrates reappear in the concentrated product and add to its adhesive value, but they are not so desirable in tanning extracts.

In commercial utilization, the weak liquor is neutralized with lime and evaporated in a multiple effect to a sirup of about 30° Bé. and carrying about 50 per cent total solids. Sometimes this is concentrated into a dry preparation, being dried on heated drums. Both liquid and solid preparations are on the market. In making tanning preparations, lime is withdrawn from the liquid with sulphuric acid, the weak liquor being, for example, neutralized with lime and concentrated to a degree somewhat greater than 30° Bé. This heavy liquor is treated with sulphuric acid to form and precipitate calcium sulphate and give an acid tanning liquor free of lime and of about 30° Bé.

Sulphite waste liquor may be regarded as a cheap source of sugars. To some extent, the dextrose constituent has been utilized by fermenting with yeast to make alcohol, but the yeast does not attack pentoses and miscellaneous carbohydrates and the amount of dextrose present is not great.

In certain prior patents, Nos. 1,952,642 and 1,952,643, I have described and claimed effecting a substantial betterment in tanning preparations made from sulphite waste liquor, utilizing the fact that certain bacteria will ferment and destroy not only the hexoses but also the pentoses and the miscellaneous extractive matter of sulphite waste liquor. The lignosulphonic acids are not affected and operating in this way, tanning preparations can be produced free of less active material and making really good leather. In one way of operation (Patent 1,952,642), the miscellaneous carbohydrates are converted into volatile bodies, alcohols, ketones, etc., which can be recovered when this is worth while, or which may be simply allowed to escape during the concentration of the fermented liquor precedent to making tanning preparations. In another way of operating (Patent 1,952,643), the carbohydrates of the liquor are converted by bacteria into lactic acid which, although having no tanning value per se, is a useful constituent of tanning liquors and is allowed to remain therein.

In the first of these patented methods, it may be noted, non-tans are fermented and the fermentation products distilled out. In the other patented method, the non-tans in the liquor are converted into lactic acid which is compatible with the tans and need not be removed. In both processes, bacteria are used.

I have now found that by using another class of organisms, those producing citrates, which are mostly molds, I can ferment the carbohydrates accompanying the lignosulphonates in the liquor to produce insoluble lime salts which can be filtered off and removed, leaving a residual liquor better adapted in making high grade tanning preparations. The insoluble lime salts filtered off and removed form a valuable by-product, being a new and economical source of citric acid. In addition to citric acid there is usually a production of some oxalic acid. All the acids formed are removed from the liquor as insoluble lime salts and the liquid is made purer as regards lignosulphonates; the ratio of lignosulphonates to other soluble bodies is considerably increased. The liquid separated from the lime salts may be, as in the acknowledged patents, used as a source material for making particularly desirable tanning preparations or it may be concentrated to make adhesives of a somewhat different type from the concentrated whole liquor. It contains a higher ratio of "tans" (lignosulphonates) to non-tans (other solubles).

In the method of the present application, the non-tans are converted into insoluble lime salts and filtered out, leaving a clear liquid for utilization elsewhere. Molds are used in fermenting.

In the insoluble lime salts, citrate is the predominant constituent, but there also occurs some oxalate and salts of other acids, such as fatty acids formed in fermentation.

The carbohydrates of sulphite liquor are not readily fermented by any organism, the liquid indeed having a certain amount of antiseptic value. But citrate producing organisms can be acclimatized to the liquor by growing successive cultures in media containing increasing quantities of sulphite waste liquor, and some of these organisms so acclimatized ferment practically everything in sulphite waste liquor other than the lignosulphonic acids. Certain molds have this property. Among the more efficient organisms are Aspergillus and Penicillium. Certain acclimatized races of *Aspergillus niger* ("black molds") are particularly efficient in removing the carbohydrates of sulphite waste liquor and in producing citrate therefrom. Most of these produce some oxalate as well, the ratio of citrate to oxalate varying with the particular organism. In all cases, after acclimatizing organisms to sulphite waste liquor by growing in media containing increasing quantities thereof, it is worth while making colonies and cultures to isolate the most efficient organisms; strains rapidly fermenting substantially all the carbohydrates present with production of high yields of citrate.

Formation of citric acid from the sugars represents an oxidation; $C_6H_{12}O_6$, for example, becoming $C_6H_8O_7$. This represents a subtraction of four hydrogen atoms and the addition of one oxygen. While the organisms produce citrate in the absence of air, the action is facilitated and the yield increased by aeration and by the use of air under pressure. I find it best to work under an air pressure of 15 to 30 pounds gage with occasional or continuous inflow of air to keep up the $O_2$ concentration.

In the routine of operation under the present invention, raw sulphite waste liquor, which may come direct from the pulp mill, is first blown with air to reduce the $SO_2$ content. This should be carried out until the content of free $SO_2$ does not exceed about 0.03 per cent and the $SO_2$ in loose combination does not exceed about 0.4 per cent. Excess $SO_2$ has a toxic effect on the metabolism of even acclimatized molds. The liquor is then neutralized, advantageously with dolomite lime, and settled to remove precipitated matter.

In order to supply nutrient salts for the organisms potassium salts, ammonium salts or nitrates and phosphates are added in small amounts. The liquor is then placed in a pressure vessel and inoculated with a mold culture produced from acclimatized organisms. After inoculation, the tank is put under air pressure and the temperature maintained at about 35° C., which appears to be the most effective temperature, and is readily maintained substantially constant, being somewhat above ordinary atmospheric temperatures. Fermentation takes place. The fermenting liquid is advantageously subjected to mechanical agitation. The acidity which develops during fermentation is best neutralized by injections of lime milk, from time to time or continuously; but if desired, the acidity may be allowed to develop without neutralization. Chalk or air slaked lime is sometimes added to the liquid, but this develops $CO_2$ and, to that extent, lessens the $O_2$ concentration in the atmosphere of the apparatus. Under the conditions described, fermentation is rapid and is often substantially complete in as little as 12 hours. Fermentation being accompanied by absorption of oxygen, its progress can be followed by watching a pressure gage. At atmospheric pressure, the fermentation requires 4 to 6 days. When fermentation has gone to its practical limit, the liquor is neutralized with lime, added in slight excess. Calcium salts of citric and oxalic acids are precipitated and are separated by simple filtration.

The filtrate is then diverted to evaporating apparatus and converted into adhesives or tanning preparations in known ways. The press cake of calcium citrate (and other calcium salts) is broken up, admixed with water and treated with sulphuric acid to precipitate the calcium as calcium sulphate. The acids are recovered by concentration and crystallization in known ways.

In an example of a specific embodiment of the process, 1000 pounds of raw waste sulphite liquor, having a reducing sugar content of 2.5 per cent based on the weight of raw liquor were air-blown until the $SO_2$ content was reduced to the concentrations set forth ante. The batch was then neutralized with dolomite lime and allowed to settle. Some matter precipitated out. The settled liquor was decanted and there was added to the batch, 0.2 pound magnesium sulphate, 0.3 pound dibasic potassium phosphate and 2.25 pounds ammonium nitrate. The material was then sterilized by heating, cooled and inoculated with an active acclimatized culture of *Aspergillus niger*. The active culture was acclimatized in a manner similar to that employed with bacteria as described in my prior Patent 1,952,642 and the acclimatized organisms plated and cultured in known ways to isolate efficient organisms. An air pressure of 30 pounds per square inch gage was maintained on the pressure vessel. At the end of 24 hours, fermentation reached its practical limit. The proportion of reducing sugar at the end of the operation was 0.1 per cent. The liquor was then neutralized with milk of lime added in excess, boiled and the calcium salts of citric and oxalic acids thus formed were separated by filtration. The filter cake was broken up in water and treated with sulphuric acid, yielding insoluble calcium sulphate. The free acids remaining in solution were recovered by concentration and crystallization in known ways. Some 7.7 pounds of citric and 1.9 pounds of oxalic acid were recovered in this particular work with the particular acclimated Aspergillus organism used.

What I claim is:—

1. In the improvement of sulphite waste liquor for tanning purposes by removing carbohydrates therefrom with production of citrate, the process which comprises neutralizing the waste liquor, inoculating with a citric acid-producing mold culture acclimatized to sulphite waste liquor, allowing fermentation to go forward in the presence of sufficient lime to form calcium citrate and at a temperature of about 35° C., and filtering off the calcium citrate to produce an improved waste liquor richer in tanning material and a filter cake of lime salts including citrate.

2. In the process of claim 1, preliminary air blowing the sulphite waste liquor to remove free and loosely combined $SO_2$.

3. In the process of claim 1, operating under an imposed air pressure with replenishment of the air to maintain a maximum $O_2$ concentration.

4. The process of claim 1 wherein the mold culture used is a race of Aspergillus acclimatized to sulphite waste liquor by growing successive cultures in media containing increasing quantities of sulphite waste liquor.

FREDRICK J. WALLACE.